United States Patent [19]

Crow et al.

[11] Patent Number: 5,047,966

[45] Date of Patent: Sep. 10, 1991

[54] AIRFOIL MEASUREMENT METHOD

[75] Inventors: Kevin H. Crow, Lima; Melvin L. Morris, Spencerville, both of Ohio; William F. Derouchie, Southfield; Dan W. Prevost, Livonia, both of Mich.

[73] Assignee: Airfoil Textron Inc., Lima, Ohio

[21] Appl. No.: 354,727

[22] Filed: May 22, 1989

[51] Int. Cl.$^5$ .................................................. G01B 5/20
[52] U.S. Cl. ................................ 364/560; 364/474.37; 33/554; 33/504
[58] Field of Search .................. 364/559–561, 364/577, 474.29, 474.37, 723; 33/551, 553, 554, 503, 504

[56] References Cited

U.S. PATENT DOCUMENTS

| | | | |
|---|---|---|---|
| 4,031,369 | 6/1977 | Heaman et al. | 364/474.29 X |
| 4,296,474 | 10/1981 | Hurt | 33/503 X |
| 4,603,487 | 8/1986 | Matsunata | 33/503 X |
| 4,648,024 | 3/1987 | Kato et al. | 364/474.29 |
| 4,724,525 | 2/1988 | Purcell et al. | 364/560 |
| 4,755,927 | 7/1988 | Kishi et al. | 364/474.29 X |
| 4,755,952 | 7/1988 | Johns | 364/560 X |
| 4,794,540 | 12/1988 | Gutman et al. | 364/474.29 |
| 4,799,170 | 1/1989 | Nakaya et al. | 364/450 X |
| 4,811,253 | 3/1989 | Johns | 364/560 |
| 4,901,256 | 2/1990 | McMurtry et al. | 33/503 X |
| 4,908,951 | 3/1990 | Gurny | 33/503 |
| 4,922,431 | 5/1990 | Carter, III | 364/474.29 X |

Primary Examiner—Joseph L. Dixon
Attorney, Agent, or Firm—John C. Evans

[57] ABSTRACT

A coordinate measuring machine is used to extract data points from an airfoil surface. The machine is controlled to move a probe to desired points by a generic program applicable to any airfoil and a nominal data file specific to the type of airfoil being measured containing coordinates of desired data points, surface normal vectors and optional machine control instructions arranged in the order of usage. The program reads the data file and predicts the location of corresponding data points on the surface from the file data and deviation information available from already-sampled data points on the blade. An analysis program accepts the data points, mathematically reconstructs portions of the airfoil and measures dimensions from those portions. The dimensions are compared to tolerances read from another file specific to the airfoil type.

1 Claim, 3 Drawing Sheets

AIRFOIL MEASUREMENT METHOD

FIELD OF THE INVENTION

This invention relates to a method of measuring an airfoil and particularly to such a method using a computer controlled measuring machine.

BACKGROUND OF THE INVENTION

A variety of commercially available coordinate measurement machines have been used for measurement of parts of various type including airfoils. Such machines take readings of surface points by moving mechanical or optical probes along the surface of the part in a continuous motion or by moving the probes to discrete points along the surface to digitize the surface and thus provide a data file which can be analyzed to obtain dimensions of the part. In high production operations where every production part must be quickly and accurately measured and the apparatus is in nearly constant use, a very robust system is required to stand up under the load. In the case of air foils, a single turbine blade may require the measurement of say, 840 distinct points on 28 different sections to an accuracy of a few ten-thousandths of an inch and the complete survey of the blade should be completed within 40 minutes. In so doing the measurement, the probe (assuming a mechanical contact type) must efficiently move from point to point, gently touching the surface in each site and yet moving quickly between points and not colliding with the blade or the fixture holding the blade. The number of measurement points must not be compromised lest the measurement accuracy suffer.

U.S. Pat. No. 4,755,952 to Johns discloses a turbine blade measurement method and apparatus which uses a probe which is continuously scanned across the surface to track chordal sections of the part and a program analyzes the data for conformation to a desired part envelope.

U.S. Pat. No. 4,724,525 to Purcell et al is directed to a multi-axis measuring machine which moves an analog probe continuously across a surface and takes readings at specific points for use in subsequent data analysis. Three options are given for determining data points: time elapsed, distance traveled, and operator command.

U.S. Pat. No. 4,653,011 to Iwano disclose a coordinate measuring instrument for moving a probe in a stored path along a surface to be measured and takes readings at discrete points. Measurements are based on the readings.

U.S. Pat. No. 4,679,331 to Koontz discloses a method of measuring the contour of bent glass by moving a probe around a path of a fixture and making measurements at many points to teach a path to the control. After glass is inserted in the fixture the same path is automatically followed to measure the glass and determine its contour relative to the fixture.

U.S. Pat. No. 4,370,721 to Berenberg et al discloses an NC machine tool programmed to measure features on a rough part prior to machining to determine any offsets which may be used to modify the machining program. No adjustments of the measuring program are made.

SUMMARY OF THE INVENTION

It is therefore an object of the invention to provide a method of measuring an air foil having a general application to all air foils yet specific to a given type of air foil and dynamically adaptive to a specific part being measured.

It is a further object of the invention to provide a method of controlling a computer operated coordinate measuring machine with enhanced speed and accuracy.

The invention is carried out by the method of measuring an airfoil comprising the steps of: activating a control program for control of a measuring machine probe, supplying nominal coordinates of the airfoil to be measured to the control program, acquiring data points on the airfoil corresponding to the nominal coordinates by moving the probe to each such point, and measuring the airfoil by mathematically reconstructing at least certain portions of the airfoil by interpolation of the data points and determining dimensions derived from the certain portions.

The invention is further carried out by predicting each data point from the nominal coordinates adjusted by the previous acquired points.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The method of the invention is carried out by commercially available equipment including a coordinate measuring machine (CMM) with computer control. The method is embodied in a system of programs each adapted to carry out a particular function and especially adapted to communicate and coordinate with certain of the other programs. In general the probe of the CMM acquires data points along sections of the airfoil blade surface under control of the computer and thus generates a set of coordinates representing each section of the surface. Blade measurements are deduced from the set of coordinates. While the term "measurement" is generally used in the art to describe digitization or the acquisition of surface data points or coordinates by the CMM, that term is here reserved for the gauging of blade dimensions such as thickness or chord length as calculated from the acquired data points, thereby avoiding confusion between the two very different processes. In this description a mechanical probe is assumed; other probes such as optoelectronic probes may be used as well.

Figure 1:
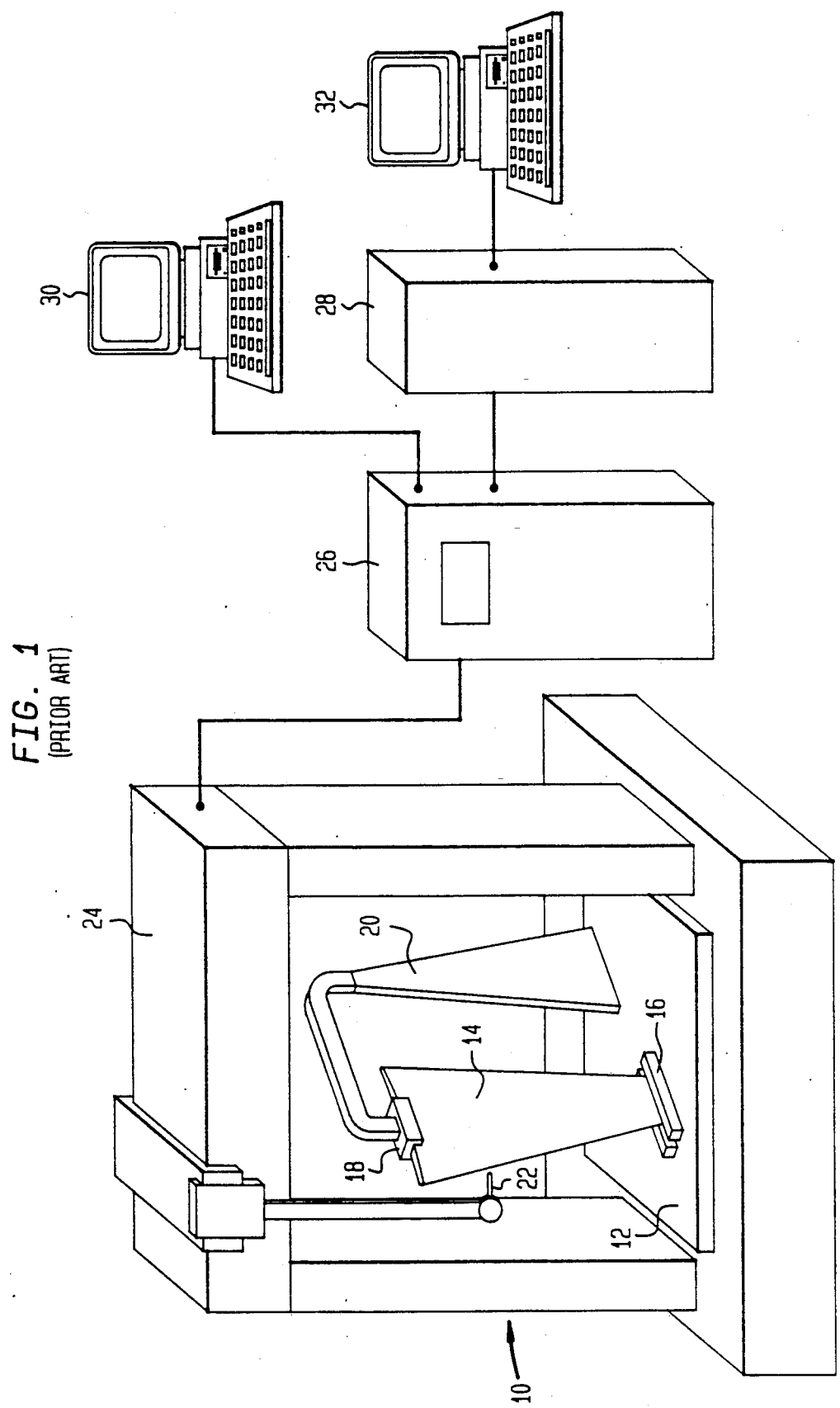
FIG. 1 is an isometric view of a coordinate measuring machine with an airfoil positioned for measurement.

Referring to FIG. 1, a CMM 10 has a table 12 holding an airfoil or turbine blade 14 by clamps 16 at the root of the blade and clamps 18 at the tip of the blade, the clamps 18 being held by a vertical fixture 20 supported on the table 12 A probe 22 is carried by an overhead gantry 24 in a manner which allows versatile movement of the probe over the surface of the blade 14 and includes instrumentation to precisely determine the coordinates of each point of contact of the probe with the blade surface. The CMM device and the described arrangement are well known in the art. Also known are a controller or machine processor 26 which controls the probe movement and acquires the data points, a minicomputer 28 which furnishes instructions to the processor 26 and receives the data therefrom, and a terminal 30 for user input. In the present system, a second terminal 32 is preferred for communication with the minicomputer 28.

Figures 2, 3:
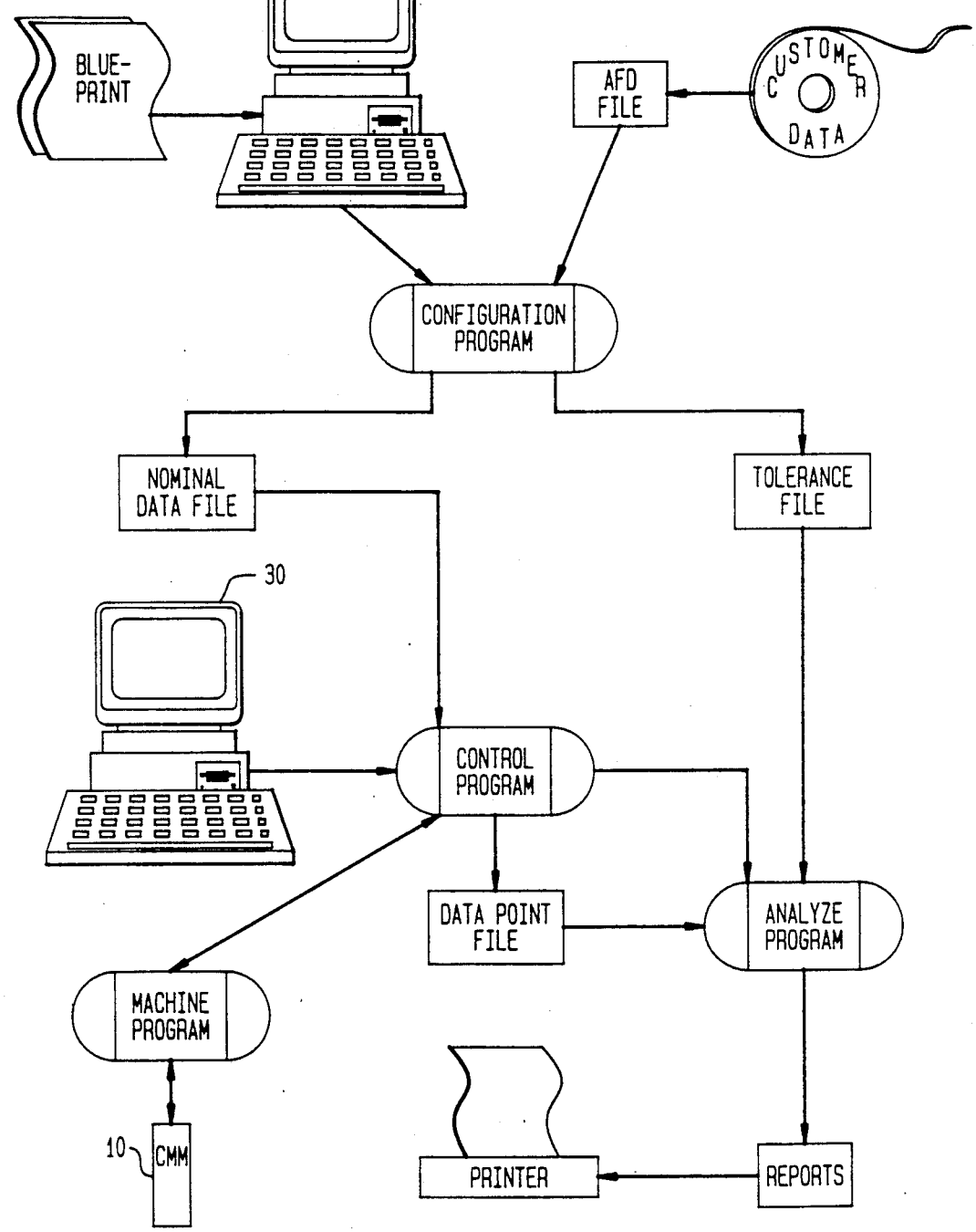
FIG. 2 is a section of the airfoil of FIG. 1 with relative probe positions shown.
FIG. 3 is a schematic diagram of a system for measuring an airfoil according to the method of the invention.

FIG. 2 shows a typical cross section of the blade 14 in a plane parallel to the machine table 12. The probe 22 is depicted in two different positions 22a and 22b. The probe is cylindrical with a rounded or hemispherical tip. The probe is used in two different modes: first, the cylindrical side of the probe 22 is moved into contact with each edge of the blade as shown at 22a to determine the blade chord end points, and second, the rounded tip contacts the convex and the concave surfaces of the blade as shown at 22b to determine surface contour points. Throughout the measuring system the coordinates of the surface along the cross sections is the basis of machine control and data acquisition.

The system flow diagram of FIG. 3 establishes the framework within which the method of the invention operates. Customer data provided on magnetic tape defines each type of blade by listing the coordinates of many points of each blade section sufficient to establish the nominal contour and dimensions of the blade. Tolerance information is not included. The defined points are used for NC machining of the blade and ar not necessarily the points where data points are to be acquired by the CMM. Further, the customer data is not necessarily in the format useful to the measuring system. Accordingly the customer data is first formatted in an AFD (airfoil data) FILE for use by the system. Next the data from the AFD FILE for a particular type of blade is input to a CONFIGURATION program which is effective through terminal interaction to create for that specific blade type a NOMINAL DATA FILE of nominal data points corresponding to the blade surface where readings are to be taken as well as normal surface vectors for the data points. The normal vectors will be used in moving the probe normal to the surface when taking a reading.

To create the NOMINAL DATA FILE the CONFIGURATION program mathematically constructs a three dimensional airfoil surface from the data in the AFD FILE using splining techniques. Operator input determines the number of desired points required for each section and the program chooses the optimum points and extracts them from the mathematical surface along with the surface normal vector for each point. Nominal data information is stored in the NOMINAL DATA FILE. The points are arranged in the NOMINAL DATA FILE in the order in which they will be used. The NOMINAL DATA FILE also has the capability of storing machine control instructions placed between data points where special machine activity is desired. Such instructions are inserted by the operator at appropriate places in the array of data points. A NOMINAL DATA FILE is created for each type of airfoil to be gauged on the CMM and is labelled according to the type.

Tolerance information is taken from blueprints and entered via the terminal 32 into a file which is accessed by the CONFIGURATION program to generate a TOLERANCE FILE which contains the allowable limits for each blade dimension to be checked by the measuring system. A TOLERANCE FILE is created for each type of blade to be gauged on the CMM and is labelled according to the type.

A CONTROL program is provided to direct the CMM 10 via a MACHINE program in the machine processor 26 to specific points for data acquisition and to receive the data points and output them in a desired format to an ANALYZE program. The MACHINE program performs generic atomic CMM actions such as slew the probe to a given point, move along a normal vector until the part is contacted, return the coordinates of the contact point, retract the probe from the part, etc. The CONTROL program is generic to a large family of airfoils so that all the data acquisition of various types of turbine blades, for example, can be managed by the same program. To make the control specific to a particular type of blade, the blade type information is input via the terminal 30 to call up the specific NOMINAL DATA FILE for that type. Further, to make the control specific to the particular part being measured a dynamic or adaptive control method is used by the program. Identification of the specific blade being measured is also input via the terminal 30. The CONTROL program reads the data from the NOMINAL DATA FILE point-by-point and dynamically predicts the location of the corresponding points to control the CMM accordingly.

The CONTROL program is predicated on the expectation that the part being measured conforms fairly closely to the nominal data for that type of part and that deviations from nominal can be predicted approximately from points on the part already read. The system makes use of the fact that the root form of the airfoil has already been precisely machined and that the portion of the airfoil near the root can be expected to be quite close to the specified position and shape. Even if the root section was not expected to be quite close, the system could be instructed to repeatedly digitize the root section until the prediction error was arbitrarily small. The first portion of the airfoil to be digitized is the section nearest the root and then sections progressively nearer the tip are digitized. For the first section the expected position of the next point is predicted from the nominal data, the chord length and the previous data point. Any deviation of the previous point from the nominal coordinate or of the chord length from the nominal length will be used to adjust or update the next nominal coordinate. For subsequent sections the update of each coordinate is based on the previous point and the chord length as well as the previous section. For the first point on a section only the previous section and the chord length are used for the adjustment.

Figure 4:
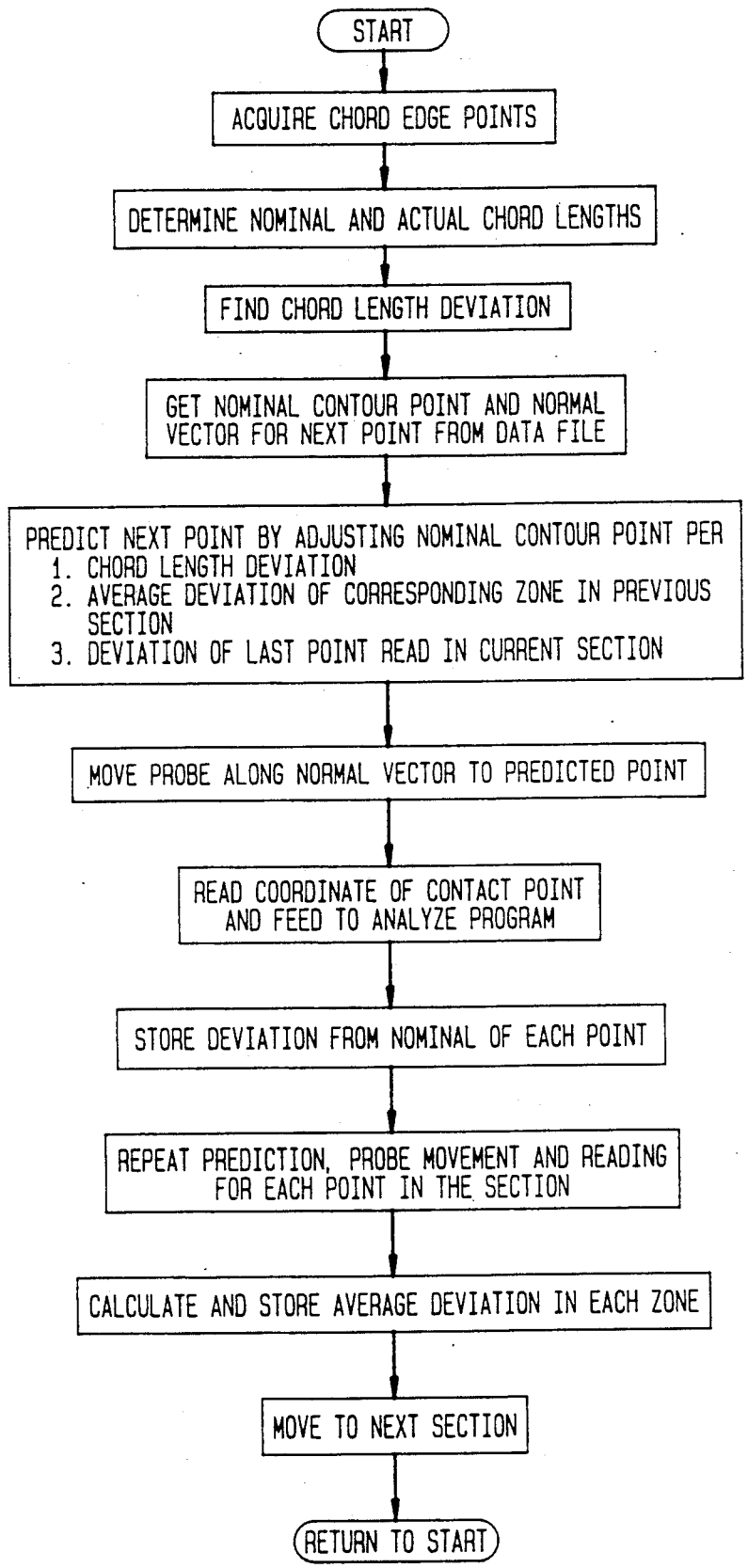
FIG. 4 is flow diagram for control of the coordinate measuring machine of FIG. 1 for data acquisition according to the method of the invention.

The diagram of FIG. 4 illustrates the control method. It is to be understood that for each step where nominal data is needed the CONTROL program reads it from the NOMINAL DATA FILE. For each section of the blade, the first points to be read are the edge points which define the chord. The nominal and actual chord lengths are computed and compared to find the percent deviation. Then the nominal contour points along the blade are scaled or adjusted in the direction of the chord according to the chord length deviation. Although the allowable tolerance of chord length is on the order of one percent, that amount of adjustment is important for enhancing precision particularly for the points near the edges which will define thin blade sections and small radius curves. Except for the first section checked on each blade, the average deviations of points in previously sampled sections is also used to help predict the true coordinates to be measured. The periphery of the section is divided into ten zones and the average deviation for each zone is used for the prediction of true coordinates in the corresponding zone of the next section. Finally, any deviation in the last point measured in a given section is used in the prediction of the next point. The predicted data points are substituted for the nominal data points for probe control. Then the probe is moved to each predicted point, in turn, to find the actual coordinates on the blade surface and the thus acquired data points are fed to the ANALYZE program. The deviation from nominal for each point and the average deviation for each section are stored for use in predictions for points yet to be read. In this manner the probe can be moved from point to point and section to section in the most effective path and at the optimum speed. During the movement, collisions with the blade and the fixture can be avoided. More importantly, the data accuracy is greatly enhanced.

The surface normal vectors in the NOMINAL DATA FILE dictate the movement of the probe in a direction normal to the surface when approaching the data point on the blade. Since the probe tip has a finite size, it may contact a point offset from the plane of the section unless its motion is normal to the surface. By using the surface normal vector for each point it is assured that the points being digitized are in the section plane.

In practice, the probe is moved between contact points at a distance of 0.080 inch from the surface at a speed of 0.3 inch/sec for the touching speed and at 10 inch/sec when being moved between points which are far apart. The NOMINAL DATA FILE also contains ad hoc instructions for the change of speed when appropriate and for avoiding a special blade holder as well as for movements to the other side of the blade or to another section. The ad hoc instructions are intercepted by the CONTROL program and directed to the MACHINE program for execution.

When the CONTROL program is activated at the beginning of a measurement session the ANALYZE program is also activated to run simultaneously with the collection of data. The acquired data points are fed from the CONTROL program to the ANALYZE program so that each section can be analyzed to determine certain dimensions such as the thickness of prescribed sections. The ANALYZE program mathematically reconstructs necessary portions of the section contour by interpolating the needed points by well known methods so that the dimensions can be measured or derived from the data. Splining techniques may be used for this purpose but are not essential. These measured dimensions correspond to the tolerances listed in the TOLERANCE FILE which are read from the file and compared with the measured dimensions. A report showing the results for each dimension and highlighting out-of-tolerance conditions is issued by the ANALYZE program and printed.

The CONTROL program also feeds information to a DATA POINT FILE which stores data like that used by the ANALYZE program so that optionally the analysis can be repeated or delayed until after all the data points are read.

The embodiments of the invention in which an exclusive property or privilege is claimed are defined as follows:

1. The method of measuring an airfoil comprising the steps of:
    activating a control program for controlling the movement of a measuring machine probe,
    supplying nominal coordinates of the airfoil to be measured to the control program,
    moving the probe to the nominal coordinates under program control,
    acquiring data points on the airfoil corresponding to the nominal coordinates,
    measuring the airfoil by mathematically reconstructing at least certain portions of the airfoil by interpolation utilizing the data points and determining dimensions from the certain portions,
    and wherein the control program further compensates for deviations between the nominal and actual coordinate points for movement of the probe and acquisition of data points by the further steps of:
    determining the length of a nominal chord from the nominal coordinates,
    for each airfoil section, acquiring data points sufficient to define an actual airfoil chord and calculating the difference of length between the actual airfoil chord and the nominal chord,
    predicting the position of other data points to be measured from the nominal coordinates and the calculated difference of length, and
    substituting the predicted data points for the nominal coordinates for the movement of the probe, whereby the efficiency and accuracy of probe movement is enhanced.

* * * * *